United States Patent
Liu et al.

(10) Patent No.: US 11,640,080 B2
(45) Date of Patent: May 2, 2023

(54) REFLECTIVE DISPLAY PANEL AND DISPLAY DEVICE

(71) Applicants: Hefei BOE Optoelectronics Technology Co., Ltd., Anhui (CN); BOE Technology Group Co., Ltd., Beijing (CN)

(72) Inventors: Yanni Liu, Beijing (CN); Hui Wang, Beijing (CN); Huijuan Yu, Beijing (CN); Yang Xue, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/531,278

(22) Filed: Nov. 19, 2021

(65) Prior Publication Data
US 2022/0252935 A1    Aug. 11, 2022

(30) Foreign Application Priority Data
Jan. 29, 2021    (CN) .......................... 202110127091.5

(51) Int. Cl.
*G02F 1/1335* (2006.01)
*G02F 1/13363* (2006.01)
*G02F 1/1337* (2006.01)
*G02F 1/137* (2006.01)
*G02F 1/1347* (2006.01)

(52) U.S. Cl.
CPC ........ *G02F 1/133531* (2021.01); *G02F 1/137* (2013.01); *G02F 1/1337* (2013.01); *G02F 1/1347* (2013.01); *G02F 1/133638* (2021.01); *G02F 2203/02* (2013.01); *G02F 2203/30* (2013.01); *G02F 2203/58* (2013.01); *G02F 2413/02* (2013.01); *G02F 2413/06* (2013.01)

(58) Field of Classification Search
CPC .................................................. G02F 1/133531
See application file for complete search history.

(56) References Cited

U.S. PATENT DOCUMENTS

2009/0033837 A1\* 2/2009 Molsen ............... G02F 1/13363
349/114

\* cited by examiner

*Primary Examiner* — Edmond C Lau
(74) *Attorney, Agent, or Firm* — IPro, PLLC

(57) ABSTRACT

A reflective display panel and a display device are provided. The reflective display includes: a first liquid crystal cell including a first substrate and a second substrate oppositely arranged to each other, and a first liquid crystal layer between the first substrate and the second substrate; a plurality of pixel units on the first substrate, where each pixel unit includes a first sub-pixel unit and a second sub-pixel unit; an optical structure, arranged at a light-emitting side of the first liquid crystal cell and covering the pixel units.

16 Claims, 9 Drawing Sheets

| deflection angle of first sub-liquid crystal layer | 5"(initial unpowered state) | | |
|---|---|---|---|
| Wavelength | B 450nm | G 550nm | R 700nm |
| 1. First polarizer 6 | Direction of linear polarization θ | Direction of linear polarization θ | Direction of linear polarization θ |
| 2. 1/2 wave plate 5 | Left-handed ellipse | Wire(s) | Right-handed ellipse |
| 3. 1/4 wave plate 4 | Wire(s) | Circle of left hand rotation | Left-handed ellipse |
| 4. First sub-liquid crystal layer (incident) | Left-handed ellipse | Wire(s) | Right-handed ellipse |
| 6. First sub-liquid crystal layer (reflection) | Left-handed ellipse +90 | Circle of right hand rotation | Right-handed ellipse |
| 7. 1/4 wave plate 4 | Right-handed ellipse | Wire(s) | Right-handed ellipse |
| 8. 1/2 wave plate 5 | Right-handed ellipse (nearly linear polarization θ orientation) | Right-handed ellipse (nearly linear polarization θ orientation) | Left-handed ellipse (nearly linear polarization θ direction) |
| 9. First polarizer 6 | Direction of linear polarization θ | Direction of linear polarization θ | Direction of linear polarization θ |
| Whether light is emitted or not | Light emission | Light emission | Light emission |
| Displaying color | White | | |
| The polarization state of the reflected light passing through the 8 point position (1/2 wave plate 5) (the closer the distance between the 8 point position and the 9 point position on the sphere, the closer the polarization state is, the more easily the light of the wavelength is emitted) | | | |

FIG. 7

| deflection angle of first sub-liquid crystal layer | 45°(intermediate power-up state) | | |
|---|---|---|---|
| Wavelength | B 450nm | G 550nm | R 700nm |
| 1. First polarizer 6 | Direction of linear polarization θ | Direction of linear polarization θ | Direction of linear polarization θ |
| 2. 1/2 wave plate 5 | Left-handed ellipse | Wire(s) | Right-handed ellipse |
| 3. 1/4 wave plate 4 | Wire(s) | Circle of left hand rotation | Left-handed ellipse |
| 4. First sub-liquid crystal layer (incident) | Left-handed ellipse | Left-handed ellipse | Wire(s) |
| 6. First sub-liquid crystal layer (reflection) | Left-handed ellipse | Right-handed ellipse | Right-handed ellipse |
| 7. 1/4 wave plate 4 | Wire(s) | Circle of left hand rotation | Left-handed ellipse |
| 8. 1/2 wave plate 5 | Left-handed ellipse (nearly linear polarization θ+90 orientation) | Circle of right hand rotation | Near the direction of linear polarization θ |
| 9. First polarizer 6 | Direction of linear polarization θ | Direction of linear polarization θ | Direction of linear polarization θ |
| Whether light is emitted or not | Little light emission | Partial light emission | light emission |
| Displaying color | Red | | |
| The polarization state of the reflected light passing through the 8 point position (1/2 wave plate 5) (the closer the distance between the 8 point position and the 9 point position on the sphere, the closer the polarization state is, the more easily the light of the wavelength is transmitted) | | | |

FIG. 8

| deflection angle of first sub-liquid crystal layer | 85°(maximum power-on state) | | |
|---|---|---|---|
| Wavelength | B 450nm | G 550nm | R 700nm |
| 1. First polarizer 6 | Direction of linear polarization θ | Direction of linear polarization θ | Direction of linear polarization θ |
| 2. 1/2 wave plate 5 | Left-handed ellipse | Wire(s) | Right-handed ellipse |
| 3. 1/4 wave plate 4 | Wire(s) | Circle of left hand rotation | Left-handed ellipse |
| 4. First sub-liquid crystal layer (incident) | Wire(s) | Circle of left hand rotation | Left-handed ellipse |
| 6. First sub-liquid crystal layer (reflection) | Wire(s) | Circle of left hand rotation | Left-handed ellipse |
| 7. 1/4 wave plate 4 | Left-handed ellipse | Right-handed ellipse | Left-handed ellipse |
| 8. 1/2 wave plate 5 | Near the direction of linear polarization θ | Left-handed ellipse (nearly linear polarization θ+90 orientation) | Near right-handed circle |
| 9. First polarizer 6 | Direction of linear polarization θ | Direction of linear polarization θ | Direction of linear polarization θ |
| Whether light is emitted or not | Light emission | Little light emission | Partial light emission |
| Displaying color | Blue | | |
| The polarization state of the reflected light passing through the 8 point position (1/2 wave plate 5) (the closer the distance between the 8 point position and the 9 point position on the sphere, the closer the polarization state is, the more easily the light of the wavelength is transmitted) | | | |

FIG. 9

| deflection angle of second sub-liquid crystal layer | 5°(initial unpowered state) | | |
|---|---|---|---|
| Wavelength | B 450nm | G 550nm | R 700nm |
| 1. First polarizer 6 | Direction of linear polarization θ | Direction of linear polarization θ | Direction of linear polarization θ |
| 2. 1/2 wave plate 5 | Left-handed ellipse | Wire(s) | Right-handed ellipse |
| 3. 1/4 wave plate 4 | Wire(s) | Circle of left hand rotation | Left-handed ellipse |
| 4. First sub-liquid crystal layer (incident) | Right-handed ellipse | Right-handed ellipse | Left-handed ellipse |
| 6. First sub-liquid crystal layer (reflection) | Wire(s) | Right-handed ellipse | Right-handed ellipse |
| 7. 1/4 wave plate 4 | Right-handed ellipse | Left-handed ellipse | Right-handed ellipse |
| 8. 1/2 wave plate 5 | Right-handed ellipse (nearly linear polarization θ orientation) | Right-handed ellipse (nearly linear polarization θ orientation) | Left-handed ellipse (nearly linear polarization θ orientation) |
| 9. First polarizer 6 | Direction of linear polarization θ | Direction of linear polarization θ | Direction of linear polarization θ |
| Whether light is emitted or not | Light emission | Light emission | Light emission |
| Displaying color | White | | |
| The reflected light passes through the 8 point position (1/2 wave plate 5) and has a polarization null (the closer the distance between the 8 point position and the 9 point position on the sphere, the closer the polarization state is, and the more easily the light of the wavelength is transmitted) | 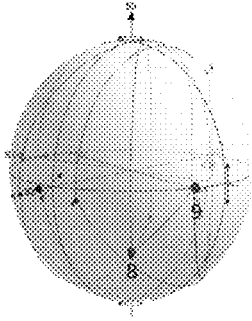 | 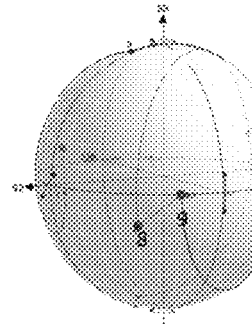 | 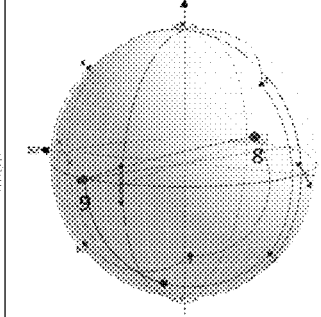 |

FIG. 10

| Second sub-liquid crystal layer deflection angle | 45°(intermediate power-up state) | | |
|---|---|---|---|
| Wavelength | 450 | 550 | 700 |
| 1. First polarizer 6 | Direction of linear polarization θ | Direction of linear polarization θ | Direction of linear polarization θ |
| 2. 1/2 wave plate 5 | Direction of linear polarization θ | Direction of linear polarization θ | Direction of linear polarization θ |
| 3. 1/4 wave plate 4 | Wire(s) | Circle of left hand rotation | Left-handed ellipse |
| 4. First sub-liquid crystal layer (incident) | Circle of right hand rotation | Left-handed ellipse | Circle of left hand rotation |
| 6. First sub-liquid crystal layer (reflection) | Right-handed ellipse | Right-handed ellipse | Left-handed ellipse |
| 7. 1/4 wave plate 4 | Left-handed ellipse | Right-handed ellipse | Right-handed ellipse |
| 8. 1/2 wave plate 5 | Right-handed ellipse (nearly linear polarization θ orientation + 90) | Left-handed ellipse (nearly linear polarization θ orientation) | Left-handed ellipse (nearly linear polarization θ orientation + 90) |
| 9. First polarizer 6 | Direction of linear polarization θ | Direction of linear polarization θ | Direction of linear polarization θ |
| Whether light is emitted or not | Little light emission | Light emission | Little light emission |
| Displaying color | Green | | |
| The reflected light passes through the 8 point position (1/2 wave plate 5) and has a polarization null (the closer the distance between the 8 point position and the 9 point position on the sphere, the closer the polarization state is, and the more easily the light of the wavelength is transmitted) | 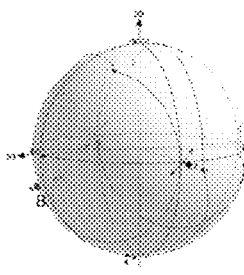 | 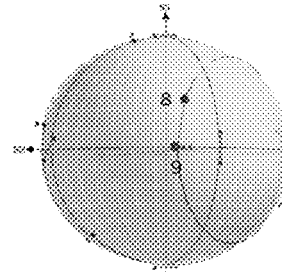 | 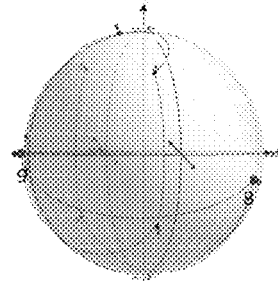 |

FIG. 11

| Liquid crystal deflection angle | 85°(maximum power-on state) | | |
|---|---|---|---|
| Wavelength | 450 | 550 | 700 |
| 1. First polarizer 6 | Direction of linear polarization θ | Direction of linear polarization θ | Direction of linear polarization θ |
| 2. 1/2 wave plate 5 | Left-handed ellipse | Wire(s) | Right-handed ellipse |
| 3. 1/4 wave plate 4 | Wire(s) | Circle of left hand rotation | Left-handed ellipse |
| 4. First sub-liquid crystal layer (incident) | Wire(s) | Circle of left hand rotation | Left-handed ellipse |
| 6. First sub-liquid crystal layer (reflection) | Wire(s) | Circle of left hand rotation | Left-handed ellipse |
| 7. 1/4 wave plate 4 | Right-handed ellipse | Right-handed ellipse | Left-handed ellipse |
| 8. 1/2 wave plate 5 | Left-handed ellipse (nearly linear polarization θ orientation) | Left-handed ellipse (nearly linear polarization θ+90 orientation) | Near right-handed circle |
| 9. First polarizer 6 | Direction of linear polarization θ | Direction of linear polarization θ | Direction of linear polarization θ |
| Whether light is emitted or not | Light emission | Little light emission | Partial light emission |
| Displaying color | Blue | | |
| The reflected light passes through the 8HW layer with a polarization null (the closer the distance between 8 and 9 on the ball, the closer the polarization state, the more easily light of that wavelength passes through) | | | |

FIG. 12

REFLECTIVE DISPLAY PANEL AND DISPLAY DEVICE

CROSS-REFERENCE TO RELATED APPLICATION

The present disclosure claims priority to Chinese Patent Application No. 202110127091.5 filed in China on Jan. 29, 2021, the present disclosure of which is hereby incorporated by reference in its entirely.

TECHNICAL FIELD

The present disclosure relates to display product technologies, and in particular, to a reflective display panel and a display device.

BACKGROUND

In the related art, the structure of a color reflective product includes an array substrate and a color filter substrate that are oppositely disposed, and a liquid crystal layer located between the array substrate and the color filter substrate, where one side of the color filter substrate away from the array substrate includes a POL (polarizer), ½ wave plates, ¼ wave plates, and a haze layer (or a scattering film), where the polarizer, ½ wave plates, and ¼ wave plates have conversion functions of circular polarization and linear polarization, a color resistance layer of a CF glass (color filter substrate) is used to implement color display, and the haze layer is usually used to increase a viewing angle. However, the color resist material has low transmittance, and natural light enters and exits twice through the color resist layer, so that the reflectance of the color reflective display is low, and if the color gamut display required by 30% is realized, the reflectance is very low because the color resist material absorbs more than 70% of light, and the experience is very poor when the color resist material is used in a normal ambient.

SUMMARY

A reflective display panel is provided in the present disclosure, including:

a first liquid crystal cell including a first substrate and a second substrate oppositely arranged to each other, and a first liquid crystal layer between the first substrate and the second substrate;

a plurality of pixel units on the first substrate, where each pixel unit includes a first sub-pixel unit and a second sub-pixel unit; and an optical structure, arranged at a light-emitting side of the first liquid crystal cell and covering the pixel units;

where for the first sub-pixel unit and the second sub-pixel unit of at least part of the pixel units, the optical structure is configured to change polarization states of lights with different wavelengths in external ambient light passing through the optical structure, to enable the lights entering into areas corresponding to the first sub-pixel unit and the second sub-pixel unit and passing through and reflected by the first liquid crystal layer to be bicolor lights respectively, and colors of the bicolor lights in the areas corresponding to the first sub-pixel unit and the second sub-pixel unit respectively are different, where the bicolor lights are two of R, G, B.

Optionally, the optical structure includes a ¼ wave plate, a ½ wave plate and a first polarizer sequentially arranged on the second substrate along a direction away from the second substrate;

an included angle between a transmission axis of the first polarizer and a retardation axis of the ½ wave plate is +/−55-65 degrees, and an included angle between a retardation axis of the ½ wave plate and a retardation axis of the ¼ wave plate is +/−10-20 degrees.

Optionally, the first sub-pixel unit includes:

a first alignment layer, arranged on a side, facing the second substrate, of the first substrate;

a second alignment layer, arranged on a side, facing the first substrate, of the second substrate;

an included angle between an alignment direction of the first alignment layer and an alignment direction of the second alignment layer is a first preset angle;

the second sub-pixel unit includes:

a third alignment layer, arranged on the side, facing the second substrate, of the first substrate;

a fourth alignment layer, arranged on the side, facing the first substrate, of the second substrate;

an included angle between an alignment direction of the third alignment layer and an alignment direction of the fourth alignment layer is a second preset angle, and the alignment direction of the third alignment layer is intersected with the alignment direction of the first alignment layer.

Optionally, the first preset angle is from 60 to 80 degrees, the second preset angle is from 60 to 80 degrees, and the third preset angle is from 85 to 100 degrees.

Optionally, different voltages are applied to the first substrate and the second substrate, and when external ambient light enters into the first sub-pixel unit, at least one of red light and blue light is emitted, and when external ambient light enters into the second sub-pixel unit, at least one of green light and blue light is emitted.

Optionally, the reflective display panel further includes a second liquid crystal cell on a side of the optical structure away from the first liquid crystal cell, the second liquid crystal cell is configured to adjust a gray scale of the reflective display panel.

Optionally, the second liquid crystal cell includes a third substrate, a fourth substrate and a second liquid crystal layer between the third substrate and the fourth substrate, a second polarizer is arranged at a side of the fourth substrate away from the third substrate, and a third polarizer is arranged at a side of the third substrate away from the fourth substrate.

Optionally, the first polarizer is reused as the third polarizer.

Optionally, the first substrate is an array substrate, and a reflective layer is arranged on a side of the array substrate adjacent to the second substrate.

A display device is further provided in the present disclosure, including a reflective display panel, where reflective display panel includes:

a first liquid crystal cell including a first substrate and a second substrate oppositely arranged to each other, and a first liquid crystal layer between the first substrate and the second substrate;

a plurality of pixel units on the first substrate, where each pixel unit includes a first sub-pixel unit and a second sub-pixel unit; and an optical structure, arranged at a light-emitting side of the first liquid crystal cell and covering the pixel units;

where for the first sub-pixel unit and the second sub-pixel unit of at least part of the pixel units, the optical structure is configured to change polarization states of lights with different wavelengths in external ambient light passing through the optical structure, to enable the lights entering into areas corresponding to the first sub-pixel unit and the second sub-pixel unit and passing through and reflected by the first liquid crystal layer to be bicolor lights respectively, and colors of the bicolor lights in the areas corresponding to the first sub-pixel unit and the second sub-pixel unit respectively are different, where the bicolor lights are two of R, G, B.

Optionally, the optical structure includes a ¼ wave plate, a ½ wave plate and a first polarizer sequentially arranged on the second substrate along a direction away from the second substrate;

an included angle between a transmission axis of the first polarizer and a retardation axis of the ½ wave plate is +/−55-65 degrees, and an included angle between a retardation axis of the ½ wave plate and a retardation axis of the ¼ wave plate is +/−10-20 degrees.

Optionally, the first sub-pixel unit includes:
a first alignment layer, arranged on a side, facing the second substrate, of the first substrate;
a second alignment layer, arranged on a side, facing the first substrate, of the second substrate;
an included angle between an alignment direction of the first alignment layer and an alignment direction of the second alignment layer is a first preset angle;
the second sub-pixel unit includes:
a third alignment layer, arranged on the side, facing the second substrate, of the first substrate;
a fourth alignment layer, arranged on the side, facing the first substrate, of the second substrate;
an included angle between an alignment direction of the third alignment layer and an alignment direction of the fourth alignment layer is a second preset angle, and the alignment direction of the third alignment layer is intersected with the alignment direction of the first alignment layer.

Optionally, the first preset angle is from 60 to 80 degrees, the second preset angle is from 60 to 80 degrees, and the third preset angle is from 85 to 100 degrees.

Optionally, different voltages are applied to the first substrate and the second substrate, and when external ambient light enters into the first sub-pixel unit, at least one of red light and blue light is emitted, and when external ambient light enters into the second sub-pixel unit, at least one of green light and blue light is emitted.

Optionally, the display device further includes a second liquid crystal cell on a side of the optical structure away from the first liquid crystal cell, the second liquid crystal cell is configured to adjust a gay scale of the reflective display panel.

Optionally, the second liquid crystal cell includes a third substrate, a fourth substrate and a second liquid crystal layer between the third substrate and the fourth substrate, a second polarizer is arranged at a side of the fourth substrate away from the third substrate, and a third polarizer is arranged at a side of the third substrate away from the fourth substrate.

Optionally, the first polarizer is reused as the third polarizer.

Optionally, the first substrate is an array substrate, and a reflective layer is arranged on a side of the array substrate adjacent to the second substrate.

BRIEF DESCRIPTION OF THE DRAWINGS

FIG. 7 shows a table indicating that the color of light emitted from the first subpixel unit is white red blue at different voltages;
FIG. 8 shows another table indicating that the color of light emitted from the first subpixel unit is white red blue at different voltages;
FIG. 9 shows yet another table indicating that the color of light emitted from the first subpixel unit is white red blue at different voltages;
FIG. 10 shows a table indicating that the color of light emitted from the second subpixel unit is white green blue at different voltages;
and
FIG. 11 shows another table indicating that the color of light emitted from the second subpixel unit is white green blue at different voltages;
and
FIG. 12 shows yet another table indicating that the color of light emitted from the second subpixel unit is white green blue at different voltages.

DETAILED DESCRIPTION

Figure 1:
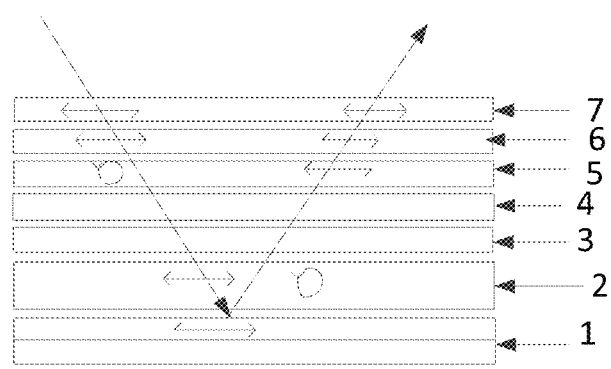
FIG. 1 is a schematic diagram of a reflective display device in the related art.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived from the description of the embodiments of the present disclosure by a person skilled in the art, are intended to be within the scope of the present disclosure.

In the description of the present disclosure, it should be noted that the terms "center", "upper", "lower", "left", "right", "vertical", "horizontal", "inner", "outer", and the like indicate orientations or positional relationships based on orientations or positional relationships shown in the drawings, only for convenience of description and simplification of description, but do not indicate or imply that the device or element referred to must have a particular orientation, be constructed in a particular orientation, and operate, and thus, should not be construed as limiting the present disclosure. Furthermore, the terms "first," "second," and "third" are used for descriptive purposes only and are not to be construed as indicating or implying relative importance.

Figure 2:
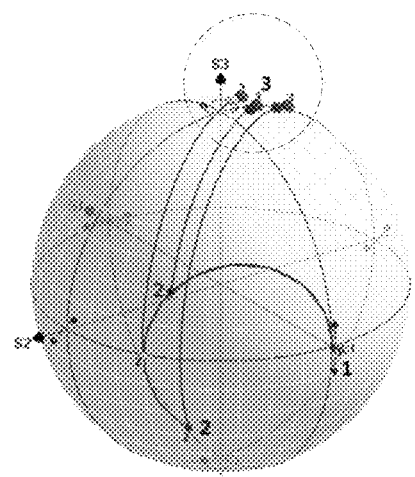
FIG. 2 is a schematic diagram of a Poincare sphere in the related art.

As shown in FIG. 1 and FIG. 2, a reflective LCD structure in the related art includes an array substrate 1 and a color filter substrate 3 that are oppositely disposed, and a liquid crystal 2 located between the array substrate 1 and the color filter substrate 3, and includes a POL (polarizer) 7, an ½ wave plate 6, a ¼ wave plate 5, and a haze layer (or scattering film) 4 on a side of the color filter substrate 3 away from the array substrate 1, so as to implement color display through three color-resistant materials of RGB. An included angle between a transmission axis of the polarizer 7 and a retardation axis of the HW wave plate (½ wave plate) 6 is about ±10 to 20 degrees, and an included angle between the retardation axis of the HW wave plate 6 and a retardation axis of the QW wave plate (¼ wave plate) 5 is about ±55 to 65 degrees, so that linear polarization with different wavelengths in light with wavelengths of 380 to 780 nm can be converted into circular polarization, as shown in a Poincare sphere shown in FIG. 2, three traces in the figure respectively represent blue light with a wavelength of 450 nm, green light with a wavelength of 550 nm, red light with a wavelength of 700 nm, and the polarization state changes of the polarizer (point 1), the HW wave plate (point 2) and the QW wave plate (point 3) are indicated. After passing through the QW wave plate, the light of the three colors is converged to a point (refer to a dotted circle marked part in FIG. 2) at a position 3, the polarization states are the same, and then the black and white display effect is realized through the liquid crystal layer. However, the color resist material has low transmittance, and natural light enters and exits twice through the color resist layer, so that the reflectance of the color reflective display is low.

Figure 3:
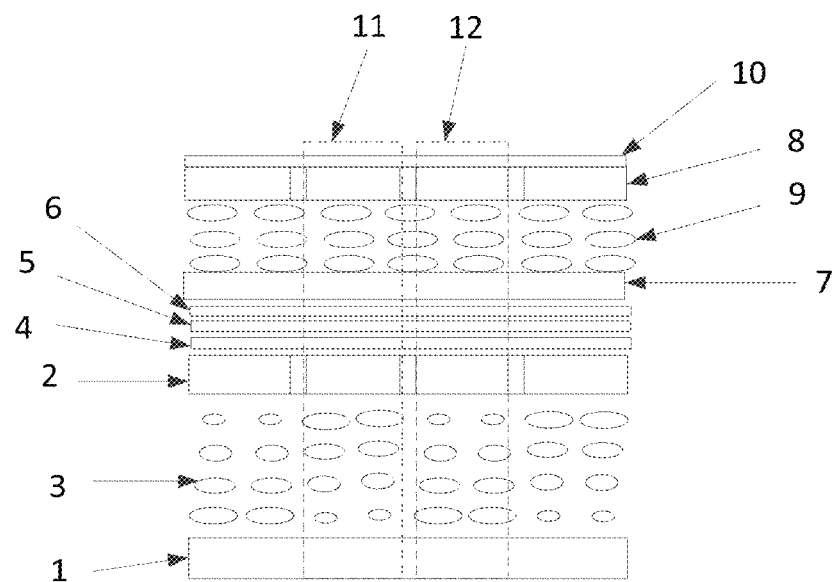
FIG. 3 is a schematic diagram of a reflective display panel according to an embodiment of the present disclosure.

In view of the above technical problem, referring to FIG. 3, the present embodiment provides a reflective display panel, including:

a first liquid crystal cell including a first substrate 1 and a second substrate 2 oppositely arranged to each other, and a first liquid crystal layer 3 between the first substrate 1 and the second substrate 2;

a plurality of pixel units on the first substrate 1, where each pixel unit includes a first sub-pixel unit 11 and a second sub-pixel unit 12; and an optical structure, arranged at a light-emitting side of the first liquid crystal cell and covering the pixel units;

where for the first sub-pixel unit 11 and the second sub-pixel unit 12 of at least part of the pixel units, the optical structure is configured to change polarization states of lights with different wavelengths in external ambient light passing through the optical structure, to enable the lights entering into areas corresponding to the first sub-pixel unit 11 and the second sub-pixel unit 12 and passing through and reflected by the first liquid crystal layer to be bicolor lights respectively, and colors of the bicolor lights in the areas corresponding to the first sub-pixel unit 11 and the second sub-pixel unit 12 respectively are different, where the bicolor lights are two of R, G, B.

In this embodiment, the optical structure is directed at least a part of the first sub-pixel unit 11 and the second sub-pixel unit 12 in the pixel unit, so that light with different wavelengths in external ambient light enters the first liquid crystal cell in different polarization states, and different voltages are applied to the first liquid crystal layer 3, so as to implement color display, without a color resistance layer.

Figure 4:
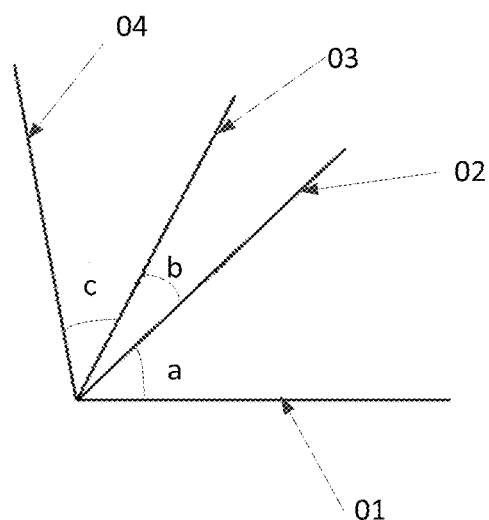
FIG. 4 is a schematic diagram illustrating angles of the first sub-alignment layer, the ¼ wave plate, the ½ wave plate, and the first polarizer according to an embodiment of the present disclosure.

As an example in this embodiment, the optical structure includes a ¼ wave plate 4, a ½ wave plate 5 and a first polarizer 6 sequentially arranged on the second substrate 2 along a direction away from the second substrate 2;

an included angle α between the transmission axis 01 of the first polarizer 6 and the retardation axis 02 of the ½ wave plate 5 is ±55 to 65 degrees, and an included angle b between the retardation axis 02 of the ½ wave plate 5 and the retardation axis 03 of the ¼ wave plate 4 is ±10 to 20 degrees, referring to FIG. 4.

As an example in this embodiment, the first sub-pixel unit 11 includes:

a first alignment layer arranged on a side of the first substrate 1 facing the second substrate 2;

a second alignment layer arranged on a side of the second substrate 2 facing the first substrate 1;

an included angle between the alignment direction of the first alignment layer and the alignment direction of the second alignment layer is a first preset angle;

the second sub-pixel unit 12 includes:

a third alignment layer arranged on a side of the first substrate 1 facing the second substrate 2;

a fourth alignment layer arranged on a side of the second substrate 2 facing the first substrate 1;

an included angle between the alignment direction of the third alignment layer and the alignment direction of the fourth alignment layer is a second preset angle, and the alignment direction of the third alignment layer is intersected with the alignment direction of the first alignment layer.

In the related art, in order to realize a full-color display in a reflective product, each pixel includes three subpixels of RGB, and in this embodiment, the optical structure makes red light, green light, and blue light incident on the first liquid crystal cell in different polarization states, and the alignment direction of the third alignment layer intersects with the alignment direction of the first alignment layer, so that the initial alignment direction of the first liquid crystal sub-layer intersects with the initial alignment direction of the second liquid crystal sub-layer, so that the first subpixel unit 11 and the second subpixel unit 12 emit light of the same or different colors, thereby realizing a full-color display. Compared with the case that each pixel includes three RGB sub-pixels, in the embodiment, full-color display can be realized only by two sub-pixel units, and the aperture opening ratio can be improved.

In this embodiment, for example, the first preset angle is 60 to 80 degrees, the second preset angle is 60 to 80 degrees, and the third preset angle is 85 to 100 degrees.

In this embodiment, an included angle c between the alignment direction of the first alignment layer 04 and the retardation axis 03 of the ¼ wave plate 4 is 50-60 degrees, and an included angle c between the alignment direction of the third alignment layer and the retardation axis of the ¼ wave plate 4 is 135-160 degrees.

In a specific implementation manner of this embodiment, the third preset angle is 90 degrees, that is, an included angle between an initial alignment direction of the first liquid crystal sub-layer and an initial alignment direction of the second liquid crystal sub-layer is 90 degrees, that is, the initial alignment direction of the first liquid crystal sub-layer is perpendicular to the initial alignment direction of the second liquid crystal sub-layer.

In this embodiment, by applying different voltages to the first substrate 1 and the second substrate 2, external ambient light can emit at least one of red light and blue light after entering the first sub-pixel unit 11, and external ambient light can emit at least one of green light and blue light after entering the second sub-pixel unit 12.

In this embodiment, for example, different voltages are applied to the first substrate 1 and the second substrate 2 of the first sub-pixel unit 11, so that the first sub-pixel unit 11 can emit white light, red light, or blue light. Different voltages are applied to the first substrate 1 and the second substrate 2 of the second sub-pixel unit 12, so that the second sub-pixel unit can emit white light, green light, or blue light.

The first sub-pixel unit 11 emits white light, red light, or blue light, and the first liquid crystal layer 3 deflects 5 to 85 degrees (note that, the deflection angle of the liquid crystal here refers to the angle at which the liquid crystal stands, and is the deflection in the vertical direction), but the invention is not limited thereto.

The second sub-pixel unit 12 emits white light, green light, or blue light, and the first liquid crystal layer 3 deflects 5 to 85 degrees, but not limited thereto.

Under the same voltage, the deflection angles of the first liquid crystal layer 3 and the second liquid crystal layer 9 are the same, the color of light emitted by the first sub-pixel element 11 and the color of light emitted by the second sub-pixel element 12 may be the same, and may be different, for example, when the first liquid crystal layer 3 and the second liquid crystal layer 9 are both deflected by 5 degrees (initially not energized), the light emitted from the first sub-pixel unit 11 and the light emitted from the second sub-pixel unit 12 are both white light, when both the first liquid crystal layer 3 and the second liquid crystal layer 9 are deflected by 45 degrees (intermediate powered state), the first sub-pixel cell 11 emits red light, the second sub-pixel cell 12 emits green light, when the first liquid crystal layer 3 and the second liquid crystal layer 9 both deflect 85 degrees (maximum power-up state), the first sub-pixel unit 11 emits blue light, and the second sub-pixel unit 12 emits blue light.

In this embodiment, an included angle α between the transmission axis 01 of the first polarizer 6 and the retardation axis 02 of the ½ wave plate 5 is ±55 to 65°, and an included angle b between the retardation axis 02 of the ½ wave plate 5 and the retardation axis 03 of the ¼ wave plate 4 is ±10 to 20°, as shown in FIG. 4. Thus, the polarization characteristics of light having different wavelengths of 380 to 780 nm are dispersed, and as shown in the Poincare sphere of FIG. 5, three traces in the figure respectively show the polarization state changes of blue light having a wavelength of 450 nm, green light having a wavelength of 550 nm, and red light having a wavelength of 700 nm passing through the first polarizer 6 (point 1), the ½ wave plate 5 (point 2), and the ¼ wave plate 4 (point 3). After passing through ¼ wave plate 4, the three colors of light have a large dispersion of polarization states to the 3 position. Then, by applying different voltages to the first liquid crystal layer 3 through the first liquid crystal layer 3, different colors can be displayed at different voltages.

In a Poincare sphere, the upper and lower hemispheres represent left-handed light or right-handed light, respectively, the pole represents circularly polarized light, the equator represents linearly polarized light, and the other positions represent elliptically polarized light. Looking at which position the last dot is at, which polarization state is indicated, for example, in FIG. 5, 1 dot indicates linear polarization, 2 dots of red (reference numeral 001) indicates that red light of 700 nm is right-handed elliptically polarized after passing through ½ wave plate 5, 2 dots of green (reference numeral 002) indicates that green light of 550 nm is now nearly linear polarization, and 2 dots of blue (reference numeral 003) indicates that blue light of 450 nm is now left-handed elliptically polarized. And so on, the dots 3 of different colors represent the polarization state of the light passing through ¼ wave plate 4.

Figure 5:
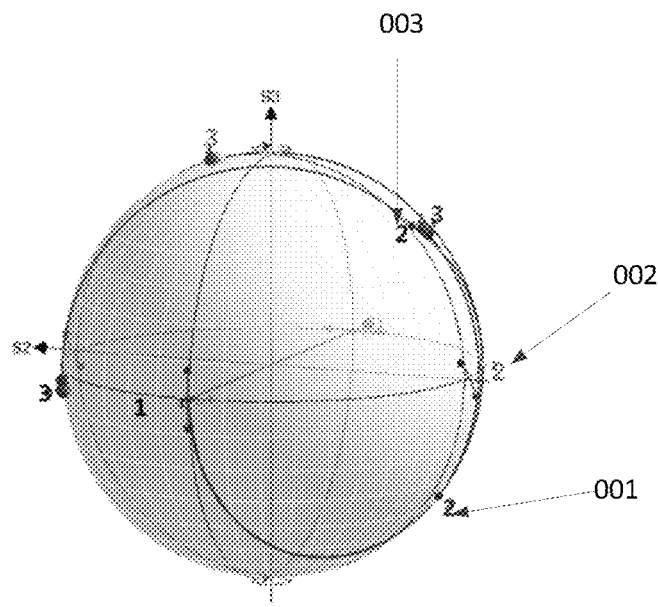
FIG. 5 is a schematic diagram of a Poincare sphere according to an embodiment of the present disclosure.

Comparing FIGS. 2 and 5, after the light passes through the first polarizer 6, ½ wave plate 5, ¼ wave plate 4, in FIG. 2, the red light, the green light, and the blue light are finally substantially converged together at the position of 3 points, which is left-handed circularly polarized light. However, the three colors of light shown in FIG. 5 are approximately horizontally polarized in the elliptical left-handed state for red light, approximately horizontally polarized for green light, and approximately linearly polarized for blue light. Therefore, the three colors of light have high dispersibility.

Note that the compensation value of the ½ wave plate 5 (for example, the compensation value is 270 nm) does not change linearly with the wavelength, and is a true half-wave plate only for light having a wavelength of 540 nm, and is not a half-wave plate for light of another color, for example, 450 nm or 700 nm. Likewise, the ¼ wave plate 4 is not ¼ wave plate 4 for all bands of light. Therefore, the light with different colors can be converged as shown in FIG. 2 or diverged as shown in FIG. 5 by changing the angle matching between the first polarizer 6, ½ wave plate 5 and ¼ wave plate 4. In this embodiment, an included angle between the transmission axis of the first polarizer 6 and the retardation axis of the ½ wave plate 5 is ±55 to 65 degrees, and an included angle between the retardation axis of the ½ wave plate 5 and the retardation axis of the ¼ wave plate 4 is ±10 to 20 degrees; the included angle between the rubbing angle of the first sub-rubbing layer and the retardation axis of the ¼ wave plate 4 is 50-60 degrees, the twist angle of the first sub-liquid crystal layer is 60-80 degrees, the included angle between the rubbing angle of the second sub-rubbing layer and the retardation axis of the ¼ wave plate 4 is 135-160 degrees, and the twist angle of the second sub-liquid crystal layer is 60-80 degrees. The optical structure thus allows red, green and blue light in the external ambient light to enter the first liquid crystal cell in different polarization states, and then a color display is achieved by applying different voltages to the first liquid crystal cell.

For the first sub-pixel unit 11, an included angle between the alignment angle of the first sub-alignment layer and the retardation axis of the ¼ wave plate 4 is 50-60°, a phase difference of the first sub-liquid crystal layer is 270±30 nm, and when a twist angle of the first sub-liquid crystal layer is 60°-80°, different voltages are applied to the first sub-liquid crystal layer, the deflection angles of the liquid crystal layer are different, intensities of light outputting RGB bands are different, and polarization states and liquid crystal deflection angles of red light, green light, and blue light in a propagation process are shown in FIGS. 7-9. When the deflection is completed from the non-application of the current to the application of the maximum voltage, the color of the light emitted from the first sub-pixel unit 11 is white when the deflection angle of the first sub-liquid crystal layer is 5 degrees, the color of the light emitted from the first sub-pixel unit 11 is red when the deflection angle of the first sub-liquid crystal layer is 45 degrees, and the color of the light emitted from the first sub-pixel unit 11 is blue when the deflection angle of the first sub-liquid crystal layer is 85 degrees.

For the second sub-pixel unit 12, the angles between the first polarizer 6, the ½ wave plate 5, and the ¼ wave plate 4 are kept unchanged, when the included angle between the alignment angle of the second sub-alignment layer and the retardation axis of the ¼ wave plate 4 is 140 to 150°, the phase difference between the second sub-liquid crystal layer layers is 270±30 nm, and the twist angle of the second sub-liquid crystal layer is 60 to 80°, different voltages are applied to the second sub-liquid crystal layer, the deflection angles of the second sub-liquid crystal layer are different, the light intensities of the RGB bands are different, and the polarization states and the liquid crystal deflection angles of the red light, the green light, and the blue light in the transmission process are shown in FIGS. 10-12. When the deflection is completed from the non-application of the current to the application of the maximum voltage, the color of the light emitted from the second sub-pixel unit 12 is white when the deflection angle of the second sub-liquid crystal layer is 5 degrees, the color of the light emitted from the second sub-pixel unit 12 is green when the deflection angle of the second sub-liquid crystal layer is 45 degrees, and the color of the light emitted from the second sub-pixel unit 12 is blue when the deflection angle of the second sub-liquid crystal layer is 85 degrees.

an included angle between a transmission axis of the first polarizer 6 and a retardation axis of the ½ wave plate 5 is a first included angle, an included angle between a retardation axis of the ½ wave plate 5 and a retardation axis of the ¼ wave plate 4 is a second included angle, an included angle between a retardation axis of the ¼ wave plate 4 and an initial orientation direction of the first liquid crystal layer 3 is a third included angle, which can be obtained from FIGS. 7-12, where FIGS. 7-9 indicate that the color of light emitted from the first subpixel unit 11 is white red blue at different voltages, FIGS. 10-12 indicate that the color of light emitted from the second subpixel unit 12 is white green blue at different voltages, and the initial orientation direction of the first liquid crystal layer is perpendicular to the initial orientation direction of the second liquid crystal layer, that is, when the first included angle and the second included angle are constant, the initial alignment direction of the first liquid crystal layer 3 is rotated by 90 degrees, and the color of light emitted from the pixel unit is changed from white red blue to white green blue. Therefore, in a specific implementation manner of this embodiment, the pixel unit includes a first sub-pixel unit 11 and a second sub-pixel unit 12, an initial alignment direction of the first sub-liquid crystal layer in the first sub-pixel unit 11 is perpendicular to an initial alignment direction of the second sub-liquid crystal layer in the second sub-pixel unit 12, and the first sub-pixel unit 11 and the second sub-pixel unit 12 are matched to realize a full-color display.

In order to realize a full-color display, an angle between the initial alignment direction of the first liquid crystal sub-layer and the initial alignment direction of the second liquid crystal sub-layer is not limited to 90 degrees, and may be, for example, 85 to 100 degrees.

Figure 6:
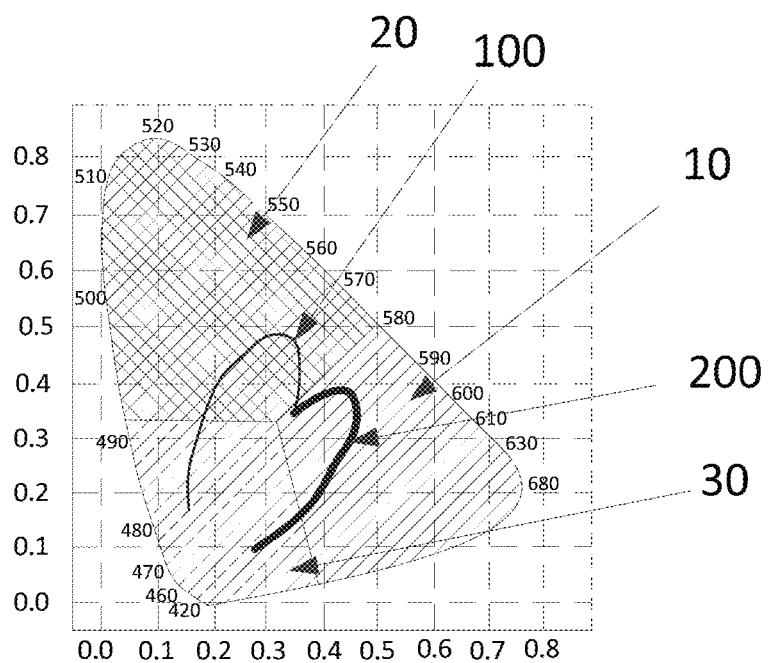
FIG. 6 shows a color gamut diagram of light emitted by the reflective display panel according to an embodiment of the present disclosure.

It should be noted that, when a first included angle between the transmission axis of the first polarizer 6 and the retardation axis of the ½ wave plate 5, a second included angle between the retardation axis of the ½ wave plate 5 and the retardation axis of the ¼ wave plate 4, and a third included angle between the retardation axis of the ¼ wave plate 4 and the initial alignment direction of the first liquid crystal layer 3 are different, different color display can be implemented by using different matching modes. Referring to FIG. 6,10 denotes red, 20 denotes green, 30 denotes blue, a line segment 100 denotes a color gamut of light that can be emitted by the second sub-pixel unit, and a line segment 200 denotes a color gamut of light that can be emitted by the first sub-pixel unit.

Referring to FIG. 6, in this embodiment, different voltages are applied to the first substrate 1 and the second substrate 2, and after entering the first sub-pixel unit 11, external ambient light can emit at least one of red light and blue light, and after entering the second sub-pixel unit 12, external ambient light can emit at least one of green light and blue light.

Under the action of the optical structure, the dispersion of the polarization state of the RGB light is large, and then the phase difference is adjusted through the liquid crystal, so that the light with different colors is output along with the rotation of the liquid crystal. However, the phase difference range of the liquid crystal rotation is limited, so that the sequential output of light in all wavebands cannot be realized, and only light with adjacent wavelength compensation values, such as red blue or green blue, can be matched.

In view of the above problem, in this embodiment, the reflective display panel further includes a second liquid crystal cell on a side of the optical structure away from the first liquid crystal cell, where the second liquid crystal cell is used to adjust the gray scale of the reflective display panel.

In this embodiment, the second liquid crystal cell includes a third substrate 7, a fourth substrate 8 and a second liquid crystal layer 9 located between the third substrate 7 and the fourth substrate 8, which are oppositely disposed, a second polarizer 10 is arranged on one side of the fourth substrate 8 far away from the third substrate 7, and a third polarizer is arranged on one side of the third substrate 7 far away from the fourth substrate 8.

In this embodiment, the first polarizer 6 is reused as the third polarizer.

Although the second liquid crystal cell is added, a certain transmittance may be lost, but the first polarizer 6 is reused as the third polarizer, and compared with a reflective display panel provided with a color resistance layer, the reflectance still has a certain advantage, and through simulation, in this embodiment, the reflectance of the dual-cell structure using the first liquid crystal cell and the second liquid crystal cell is about 24%, and the reflectance of the reflective product having the color resistance layer in the related art is 11%, so the reflectance of the reflective display panel in this embodiment can still be increased by more than one time.

In this embodiment, the first substrate 1 is an array substrate, and a reflective layer is arranged on one side of the array substrate close to the second substrate 2.

In the manufacturing process, the transmission axis direction of the second polarizer 10 may be set to 0° (not limited to this, this direction may be any direction of 0 to 180);

the rubbing direction of the rubbing layer on the fourth substrate of the second liquid crystal cell is 0° as the transmission axis direction of the second polarizer 10, and the twist angle of the second liquid crystal layer 9 is set to 90°, so the rubbing angle of the rubbing layer on the third substrate 7 is 90°;

the phase difference of the second liquid crystal cell is set to be 350-400 nm (the second liquid crystal cell has a transmission function, plays a role of a switch, belongs to normal transmission display, has the phase difference of 300-400 and has better transmittance and color temperature);

the transmission axis direction of the first polarizer is set to 90° (i.e., the transmission axis angle of the second polarizer is +90°)

Setting the included angle between the transmission axis of the first polarizer and the retardation axis of the HW wave plate (½ wave plate) to be +/−55-65 degrees, and setting the included angle between the HW wave plate and the retardation axis of the QW wave plate (¼ wave plate) to be +/−10-20 degrees;

in the first liquid crystal cell, each pixel unit is divided into a first sub-pixel unit and a second sub-pixel unit, an included angle between a rubbing angle of a first sub-rubbing film layer of the first sub-pixel unit and a retardation axis of a QW (QW) plate is 50-60 degrees, a twisting angle of the first liquid crystal layer is 60-80 degrees, and an initial orientation direction of a first sub-liquid crystal layer in the second sub-pixel unit intersects with (can be set to be perpendicular to) an initial orientation direction of a second sub-liquid crystal layer in the first sub-pixel unit.

Regarding that the alignment directions of the initial alignment direction of the first sub liquid crystal layer in the first sub pixel unit and the initial alignment direction of the second sub liquid crystal layer in the second sub pixel unit are different, the following method can be implemented:

when the first alignment layer is manufactured, a mask is added, firstly, an area corresponding to a first sub-pixel unit is shielded, alignment of the second sub-alignment layer is achieved through a UV optical alignment irradiation mode, then the mask is translated by a pixel distance, the area corresponding to the second sub-pixel unit is shielded, an alignment light source is rotated by a preset angle (for example, 85-100 degrees, and preferably, 90 degrees can be selected), and alignment of the first sub-alignment layer is achieved through optical alignment.

The embodiment of the present disclosure also provides a display device, including a reflective display panel;

where reflective display panel includes:

a first liquid crystal cell including a first substrate and a second substrate oppositely arranged to each other, and a first liquid crystal layer between the first substrate and the second substrate;

a plurality of pixel units on the first substrate, where each pixel unit includes a first sub-pixel unit and a second sub-pixel unit; and an optical structure, arranged at a light-emitting side of the first liquid crystal cell and covering the pixel units;

where for the first sub-pixel unit and the second sub-pixel unit of at least part of the pixel units, the optical structure is configured to change polarization states of lights with different wavelengths in external ambient light passing through the optical structure, to enable the lights entering into areas corresponding to the first sub-pixel unit and the second sub-pixel unit and passing through and reflected by the first liquid crystal layer to be bicolor lights respectively, and colors of the bicolor lights in the areas corresponding to the first sub-pixel unit and the second sub-pixel unit respectively are different, where the bicolor lights are two of R, G, B.

Optionally, the optical structure includes a ¼ wave plate, a ½ wave plate and a first polarizer sequentially arranged on the second substrate along a direction away from the second substrate;

an included angle between a transmission axis of the first polarizer and a retardation axis of the ½ wave plate is +/−55-65 degrees, and an included angle between a retardation axis of the ½ wave plate and a retardation axis of the ¼ wave plate is +/−10-20 degrees.

Optionally, the first sub-pixel unit includes:

a first alignment layer, arranged on a side, facing the second substrate, of the first substrate;

a second alignment layer, arranged on a side, facing the first substrate, of the second substrate;

an included angle between an alignment direction of the first alignment layer and an alignment direction of the second alignment layer is a first preset angle;

the second sub-pixel unit includes:

a third alignment layer, arranged on the side, facing the second substrate, of the first substrate;

a fourth alignment layer, arranged on the side, facing the first substrate, of the second substrate;

an included angle between an alignment direction of the third alignment layer and an alignment direction of the fourth alignment layer is a second preset angle, and the alignment direction of the third alignment layer is intersected with the alignment direction of the first alignment layer.

Optionally, the first preset angle is from 60 to 80 degrees, the second preset angle is from 60 to 80 degrees, and the third preset angle is from 85 to 100 degrees.

Optionally, different voltages are applied to the first substrate and the second substrate, and when external ambient light enters into the first sub-pixel unit, at least one of red light and blue light is emitted, and when external ambient light enters into the second sub-pixel unit, at least one of green light and blue light is emitted.

Optionally, the display device further includes a second liquid crystal cell on a side of the optical structure away from the first liquid crystal cell, the second liquid crystal cell is configured to adjust a gray scale of the reflective display panel.

Optionally, the second liquid crystal cell includes a third substrate, a fourth substrate and a second liquid crystal layer between the third substrate and the fourth substrate, a second polarizer is arranged at a side of the fourth substrate away from the third substrate, and a third polarizer is arranged at a side of the third substrate away from the fourth substrate.

Optionally, the first polarizer is reused as the third polarizer.

Optionally, the first substrate is an array substrate, and a reflective layer is arranged on a side of the array substrate adjacent to the second substrate.

The display device may be: the display device includes any product or component with a display function, such as a liquid crystal television, a liquid crystal display, a digital photo frame, a mobile phone, a tablet personal computer and the like, where the display device further includes a flexible circuit board, a printed circuit board and a back plate.

While the foregoing is directed to embodiments of the present disclosure, it will be appreciated by those skilled in the art that various changes and modifications may be made without departing from the principles of the present disclosure, and it is intended that such changes and modifications be considered as within the scope of the present disclosure.

What is claimed is:

1. A reflective display panel, comprising:
   a first liquid crystal cell comprising a first substrate and a second substrate oppositely arranged to each other, and a first liquid crystal layer between the first substrate and the second substrate;
   a plurality of pixel units on the first substrate, wherein each pixel unit comprises a first sub-pixel unit and a second sub-pixel unit; and
   an optical structure, arranged at a light-emitting side of the first liquid crystal cell and covering the pixel units;
   wherein for the first sub-pixel unit and the second sub-pixel unit of at least part of the pixel units, the optical structure is configured to change polarization states of lights with different wavelengths in external ambient light passing through the optical structure, to enable the lights entering into areas corresponding to the first sub-pixel unit and the second sub-pixel unit and passing through and reflected by the first liquid crystal layer to be bicolor lights respectively, and colors of the bicolor lights in the areas corresponding to the first sub-pixel unit and the second sub-pixel unit respectively are different, wherein the bicolor lights are two of R, G, B,
   wherein the optical structure comprises a ¼ wave plate, a ½ wave plate and a first polarizer sequentially arranged on the second substrate along a direction away from the second substrate;
   an included angle between a transmission axis of the first polarizer and a retardation axis of the ½ wave plate is +/−55-65 degrees, and an included angle between a retardation axis of the ½ wave plate and a retardation axis of the ¼ wave plate is +/−10-20 degrees.

2. The reflective display panel according to claim 1, wherein the first sub-pixel unit comprises:
  a first alignment layer, arranged on a side, facing the second substrate, of the first substrate;
  a second alignment layer, arranged on a side, facing the first substrate, of the second substrate;
  an included angle between an alignment direction of the first alignment layer and an alignment direction of the second alignment layer is a first preset angle;
  the second sub-pixel unit comprises:
  a third alignment layer, arranged on the side, facing the second substrate, of the first substrate;
  a fourth alignment layer, arranged on the side, facing the first substrate, of the second substrate;
  an included angle between an alignment direction of the third alignment layer and an alignment direction of the fourth alignment layer is a second preset angle, and the alignment direction of the third alignment layer is intersected with the alignment direction of the first alignment layer.

3. The reflective display panel according to claim 2, wherein the first preset angle is from 60 to 80 degrees, the second preset angle is from 60 to 80 degrees, and the third preset angle is from 85 to 100 degrees.

4. The reflective display panel according to claim 2, wherein different voltages are applied to the first substrate and the second substrate, and when external ambient light enters into the first sub-pixel unit, at least one of red light and blue light is emitted, and when external ambient light enters into the second sub-pixel unit, at least one of green light and blue light is emitted.

5. The reflective display panel according to claim 2, further comprising a second liquid crystal cell on a side of the optical structure away from the first liquid crystal cell, the second liquid crystal cell is configured to adjust a gray scale of the reflective display panel.

6. The reflective display panel according to claim 5, wherein the second liquid crystal cell comprises a third substrate, a fourth substrate and a second liquid crystal layer between the third substrate and the fourth substrate, a second polarizer is arranged at a side of the fourth substrate away from the third substrate, and a third polarizer is arranged at a side of the third substrate away from the fourth substrate.

7. The reflective display panel according to claim 6, wherein the first polarizer is reused as the third polarizer.

8. The reflective display panel according to claim 1, wherein the first substrate is an array substrate, and a reflective layer is arranged on a side of the array substrate adjacent to the second substrate.

9. A display device, comprising a reflective display panel, wherein reflective display panel comprises:
  a first liquid crystal cell comprising a first substrate and a second substrate oppositely arranged to each other, and a first liquid crystal layer between the first substrate and the second substrate;
  a plurality of pixel units on the first substrate, wherein each pixel unit comprises a first sub-pixel unit and a second sub-pixel unit; and
  an optical structure, arranged at a light-emitting side of the first liquid crystal cell and covering the pixel units;
  wherein for the first sub-pixel unit and the second sub-pixel unit of at least part of the pixel units, the optical structure is configured to change polarization states of lights with different wavelengths in external ambient light passing through the optical structure, to enable the lights entering into areas corresponding to the first sub-pixel unit and the second sub-pixel unit and passing through and reflected by the first liquid crystal layer to be bicolor lights respectively, and colors of the bicolor lights in the areas corresponding to the first sub-pixel unit and the second sub-pixel unit respectively are different, wherein the bicolor lights are two of R, G, B,
  the optical structure comprises a ¼ wave plate, a ½ wave plate and a first polarizer sequentially arranged on the second substrate along a direction away from the second substrate;
  an included angle between a transmission axis of the first polarizer and a retardation axis of the ½ wave plate is +/−55-65 degrees, and an included angle between a retardation axis of the ½ wave plate and a retardation axis of the ¼ wave plate is +/−10-20 degrees.

10. The display device according to claim 9, wherein the first sub-pixel unit comprises:
  a first alignment layer, arranged on a side, facing the second substrate, of the first substrate;
  a second alignment layer, arranged on a side, facing the first substrate, of the second substrate;
  an included angle between an alignment direction of the first alignment layer and an alignment direction of the second alignment layer is a first preset angle;
  the second sub-pixel unit comprises:
  a third alignment layer, arranged on the side, facing the second substrate, of the first substrate;
  a fourth alignment layer, arranged on the side, facing the first substrate, of the second substrate;
  an included angle between an alignment direction of the third alignment layer and an alignment direction of the fourth alignment layer is a second preset angle, and the alignment direction of the third alignment layer is intersected with the alignment direction of the first alignment layer.

11. The display device according to claim 10, wherein the first preset angle is from 60 to 80 degrees, the second preset angle is from 60 to 80 degrees, and the third preset angle is from 85 to 100 degrees.

12. The display device according to claim 10, wherein different voltages are applied to the first substrate and the second substrate, and when external ambient light enters into the first sub-pixel unit, at least one of red light and blue light is emitted, and when external ambient light enters into the second sub-pixel unit, at least one of green light and blue light is emitted.

13. The display device according to claim 10, further comprising a second liquid crystal cell on a side of the optical structure away from the first liquid crystal cell, the second liquid crystal cell is configured to adjust a gray scale of the reflective display panel.

14. The display device according to claim 13, wherein the second liquid crystal cell comprises a third substrate, a fourth substrate and a second liquid crystal layer between the third substrate and the fourth substrate, a second polarizer is arranged at a side of the fourth substrate away from the third substrate, and a third polarizer is arranged at a side of the third substrate away from the fourth substrate.

15. The display device according to claim 14, wherein the first polarizer is reused as the third polarizer.

16. The display device according to claim 9, wherein the first substrate is an array substrate, and a reflective layer is arranged on a side of the array substrate adjacent to the second substrate.

* * * * *